United States Patent [19]
Chalex et al.

[11] 3,888,814
[45] June 10, 1975

[54] RUBBER COMPOSITIONS WITH IMPROVED PERFORMANCE AT SUB-ZERO TEMPERATURES

[75] Inventors: Paul Chalex; Selwyn R. Mather, both of Elmhurst, Ill.

[73] Assignee: The Richardson Company, Des Plaines, Ill.

[22] Filed: Aug. 24, 1972

[21] Appl. No.: 283,599

Related U.S. Application Data

[63] Continuation-in-part of Ser. No. 102,506, Dec. 29, 1970, abandoned, which is a continuation-in-part of Ser. No. 682,518, Nov. 13, 1967, abandoned.

[52] U.S. Cl....... 260/33.6 AQ; 136/166; 260/42.32; 260/83.7; 260/94.2 R
[51] Int. Cl. ... C08c 11/18; C08c 11/22; H01m 1/02
[58] Field of Search........ 260/33.6 AO, 41.5, 42.32, 260/83.7, 94.2 R; 136/166

[56] References Cited
UNITED STATES PATENTS

| | | | |
|---|---|---|---|
| 2,638,456 | 5/1953 | Laning | 260/41.5 R |
| 3,359,229 | 12/1967 | Chalex et al. | 260/33.6 AO |
| 3,400,096 | 9/1968 | Bateman et al. | 260/746 |

OTHER PUBLICATIONS

Industrial & Engineering Chemistry, Vol. 47, No. 5, pps. 1,077–1,082, Taft et al.

*Primary Examiner*—Donald E. Czaja
*Assistant Examiner*—H. H. Fletcher
*Attorney, Agent, or Firm*—John L. Hutchinson; Alan M. Abrams

[57] ABSTRACT

Hard and semi-hard rubber articles with improved performance at sub-zero temperatures and prepared from rubber compositions characterized by an elastomeric butadiene polymer containing less than about 23 weight percent of bound styrene in the polymer, about 8–25 weight percent sulfur, about 40–70 weight percent of a specific saturated oil the remainder being semi-anthracite coal dust as filler.

7 Claims, No Drawings

3,888,814

RUBBER COMPOSITIONS WITH IMPROVED PERFORMANCE AT SUB-ZERO TEMPERATURES

RELATED APPLICATIONS

This application is a continuation-in-part of copending application Ser. No. 102,506 filed Dec. 29, 1970 which in turn is a continuation of application Ser. No. 682,518 filed Nov. 13, 1967, both now abandoned.

BACKGROUND OF INVENTION

This invention is related to oil-containing rubber compositions having a sulfur content of about 8–25 weight percent based on the rubber content and which are suitable for preparing semi-hard and hard rubber articles. More particularly, it is related to compositions containing an elastomeric butadiene polymer with less than about 23 weight percent of bound styrene and a saturated oil. These compositions form molded articles which exhibit excellent impact resistance at temperatures in the order of −20° to −40°F.

Oil containing rubber compositions which are vulcanizable with sulfur have been used for a wide variety of articles over a considerable period of time. These compositions are primarily characterized by a rubber, an oil which acts as an extender, a plasticizer or lubricant, and sulfur to provide curing of the composition. In most instances, a filler such as coal dust is also present together with various modifiers for particular purposes.

In general, development of these oil-containing rubber compositions has been principally directed to compositions useful for molding into soft rubber articles and those useful for molding into hard rubber articles. In the first, the sulfur level for vulcanization is generally limited to about 4 weight percent based on the rubber present. Illustrative soft rubber articles of commercial interest are tires, industrial belts, and the like.

In the second category, the sulfur level is generally large (above about 25 weight percent) so as to provide sufficient vulcanization for forming hard rubber articles such as combs, bowling balls, and the like.

A more recent development has been rubber compositions with an intermediate sulfur content of about 8–25 weight percent. These compositions have been found useful for molding into semi-hard or hard rubber articles which also exhibit such properties as desirable impact resistance. They have found commercial acceptance as electrical storage battery containers and similar uses where a combination of hardness and impact resistance are important.

In regard to semi-hard and hard rubber articles, it has become increasingly important to improve impact resistance at low temperatures since this property tends to drop off rather significantly as temperatures are reduced below 70° to 80°F. Recently, emphasis has been placed on performance at sub-zero temperatures in the order −20° to −40°F. Accordingly, it is important that rubber compositions be developed which exhibit excellent impact resistance at these sub-zero temperature conditions.

SUMMARY

Briefly, the invention is directed to rubber compositions useful for producing semi-hard and hard molded articles having excellent impact retention at sub-zero temperatures. These compositions are characterized by a sulfur level of less than about 25 weight percent based on the rubber content, an elastomeric butadiene polymer having a bound styrene content of less than about 23 weight percent, a saturated oil and semi-anthracite coal dust as the filler.

We have found that the utilization of our rubber compositions have produced molded articles with excellent impact retention at sub-zero temperatures of the order of −20° to −40°F. Moreover, these compositions have resulted in molded articles with comparable hardness values to those for articles previously commercially used such as those illustrated in our prior patent U.S. Pat. No. 3,359,229.

DETAILED DESCRIPTION OF THE INVENTION

The rubber compositions of the invention are characterized by an elastomeric butadiene polymer having a bound styrene content of less than about 23 weight percent.

Advantageously, the polymer is characterized primarily by polymeric butadiene units and the defined percentages of bound styrene. It is understood that the styrene content ranges from 0 to about 23 weight percent, advantageously from about 0 to 15 weight percent and preferably from about 5 to about 10 weight percent, for example a butadiene styrene copolymer having about 5 to about 10 weight percent styrene.

The rubber polymer component is usually present in amount ranging from about 8 to about 20 weight percent and preferably about 8 to about 12 weight percent based on the total composition. In addition, it is usually and advantageously a solid rubber.

The oil component is present in amounts ranging from about 40 to about 70 weight percent based on the rubber polymer or about 3.5 to 7.5 weight percent based on the total composition. While aromatic oils are useful in addition to saturated oils in combination with the defined butadiene polymer, the saturated oils are particularly preferred because of the improved impact performance of the resultant molded articles at sub-zero temperatures. Those saturated oils particularly preferred are characterized by a maximum of about 8 percent nitrogen base components and 17 percent first acidaffins and a minimum of about 75 percent of saturates, second acidaffins or mixtures thereof as determined by Rostler-Sternberg analysis. In addition, these oils are furthr characterized by having preferably no asphaltenes or a maximum of about 0.5 percent.

The sulfur content of the compositions useful for preparing semi-hard or hard molded articles is usually considered to be within the range of about 1 or 8–25 weight percent of the rubber component and preferably from about 8 to about 16 weight percent based on the rubber polymer content.

In disclosing further details of the invention, reference will be made to molded rubber-base battery parts, and particularly battery containers which are multi-cell units serving to house the active components of an automotive storage battery. Such containers are specially made by molding compositions comprising of a rubbery elastomer as the principal binder and generally an inert filler such as coal dust. However, it will be understood that the principles of the invention are likewise applicable to all analogous semi-hard or hard rubber articles containing a vulcanizable rubber wherein sulfur is employed within the range of about 8–25 weight percent based on the rubber content.

As indicated, most hard rubber battery containers are formed from filled rubber compositions. In addition to rubber, oil and sulfur, these compositions comprise primarily an inert filler such as coal dust. In the present invention the coal dust employed however to achieve the high impact properties at low temperatures is semi-anthracite. As shown by the following examples bituminous coal as used in our prior U.S. Pat. No. 3,359,229, even with low styrene content, will not achieve the desired impact resistance at low temperatures as achieved with semi-anthracite. Additional components include accelerators, activators, and the like. Such compositions are compounded on mills or on a Banbury and are then molded in closed, heated molds to form the container into the desired shape and to simultaneously vulcanize the composition to a semi-hard or hard, permanent state.

In forming the compositions contemplated, a preferred process suitable for battery containers is disclosed in the patent to Bateman et al. U.S. Pat. No. 2,844,327. In such a process, after initial compounding, the batch is rapidly comminuted and cooled to remove residual heat. Additional milling may then be employed to further disperse the components and improve homogeneity. The final product, prior to molding, is preferably prepared in a powdery or granulated state.

Battery containers are subjected to considerable movement and jarring during the battery assembly process and in subsequent transportation, storage and use. Accordingly, in order to avoid cracks and similar damage, the industry has established certain impact resistance requirements. Compliance with the requirements is determined by subjecting test slabs for selected sections of a product to impact test. Such tests involve determining the resistance to cracking when struck by a falling ball of predetermined weight which is permitted to drop from selectively higher distances. Generally, molded articles of this invention are characterized by minimum average impacts at room temperature in the order of about 4 inches based on the impact tests described herein.

The following examples illustrate some of the embodiments of this invention. It is to be understood that these are for illustrative purposes only and do not purport to be wholly definitive to conditions or scope.

EXAMPLE I

Several rubber compositions were prepared from butadiene rubbers containing by weight approximately 23.5, 18.0, 14.0, 10.0, 5.0 and 0.0 percent styrene and molded into battery containers for impact testing. The rubber compositions contained by weight approximately 10 percent rubber, 75 percent semi-anthracite coal dust, 1 percent sulfur, 8 percent lime, 5 percent oil extender, and very minor amounts of lubricants. Each formulation was essentially the same except for the change in the styrene content of the rubber which was varied by blending appropriate amounts of a SBR rubber containing 23.5 percent styrene with a polybutadiene rubber.

After preparation, each composition was molded into several battery containers which were tested for hardness at ambient temperatures and for impact at approximately 77°, 0°, −20°, −30° and −40°F. The hardness test was measured in terms of a Shore Durometer. The impact consisted of subjecting the sides of the containers at substantially their mid-height to the impact of a two-pound ball dropped from successive heights until a crack appeared. This test is substantially in accordance with the procedure described in Brown's U.S. Pat. No. 2,755,658 and is measured in inches. The test results are listed in Table I below.

TABLE I

| Styrene Content (wt.%) | | 23.5 | 18.0 | 14.0 | 10.0 | 5.0 | 0.0 |
|---|---|---|---|---|---|---|---|
| Hardness | Out. | 68 | 68 | 67 | 66 | 66 | 66 |
| | In. | 66 | 65 | 64 | 64 | 64 | 64 |
| | Bot. | 67 | 67 | 65 | 65 | 65 | 65 |
| Impact at | 77°F | | | | | | |
| | Range | 29–29+ | 29–29+ | 19–29+ | 20–29+ | 24–29+ | 20–29+ |
| | Ave. | 29.0+ | 29.0+ | 27.3+ | 26.7+ | 26.5+ | 26.7+ |
| Impact at | 0°F | | | | | | |
| | Range | 17–22+ | 18–22+ | 19–22+ | 20–22+ | 21–22+ | 21–22+ |
| | Ave. | 20.2+ | 21.0+ | 21.2+ | 21.5+ | 21.8+ | 21.8+ |
| Impact at | −20°F | | | | | | |
| | Range | 5–7 | 8–10 | 10–13 | 11–15 | 17–19 | 19–21 |
| | Ave. | 6.0 | 9.0 | 11.5 | 13.2 | 17.7 | 20.0 |
| Impact at | −30°F | | | | | | |
| | Range | 4–5 | 5–6 | 5–8 | 8–9 | 10–13 | 13–17 |
| | Ave. | 4.3 | 5.8 | 7.3 | 8.8 | 12.0 | 14.8 |
| Impact at | −40°F | | | | | | |
| | Range | 2–3 | 4–5 | 5–8 | 6–7 | 7–9 | 10–14 |
| | Ave. | 2.7 | 4.2 | 6.0 | 6.2 | 8.2 | 11.7 |

As the above data demonstrate, at −20°, −30°, and −40°F, the differences in performance between the compositions become quite evident and demonstrate the benefit of reduced styrene content. At each sub-zero temperature, the impact of the composition with 0.0 weight percent styrene was in the order of 3–4 times that of the value for the composition with 23.5 weight percent styrene. Moreover, the data demonstrate that the hardness of the compositions with varying styrene content still was very comparable to the compositions containing larger amounts of styrene.

EXAMPLE II

Rubber compositions similar to those of Example I were prepared with varying sulfur contents of about 8, 10 and 11 weight percent. In each instance, the rubber was a SBR polymer with about 10 weight percent styrene. Battery containers were molded from each composition and tested for hardness and impact resistance with the results listed in Table II below.

TABLE II

| | | | | |
|---|---|---|---|---|
| Styrene (wt.%) | | 10.0 | 10.0 | 10.0 |
| Sulfur (wt.%) | | 11.0 | 10.0 | 8.0 |
| Hardness | Out. | 68 | 67 | 65 |
| | In. | 66 | 65 | 63 |
| | Bot. | 67 | 67 | 65 |
| Impact at 77°F | Range | 21–29+ | 21–29+ | 25–29+ |
| | Ave. | 26.0+ | 26.3+ | 27.5+ |
| Impact at 0°F | Range | 17–22+ | 19–22+ | 20–22+ |
| | Ave. | 20.3 | 20.5+ | 21.2+ |
| Impact at –20°F | Range | 11–14 | 11–14 | 12–16 |
| | Ave. | 12.8 | 13.2 | 14.0 |
| Impact at –30°F | Range | 7–10 | 9–12 | 10–13 |
| | Ave. | 10.0 | 11.0 | 11.2 |
| Impact at –40°F | Range | 7–9 | 9–10 | 5–9 |
| | Ave. | 8.0 | 9.2 | 7.2 |

The results demonstrate that compositions with sulfur levels of 8–11 weight percent when molded into battery containers exhibited very good impact ratings at sub-zero temperatures and that approximately 10 weight percent sulfur resulted in the best composition at a temperature of –40°F. However, in each instance, the percent retention of impact based on the average for each composition was 30 percent or better compared to the value at 77°F.

EXAMPLE III

Rubber compositions were prepared individually using a saturated oil and an aromatic oil. The saturated oil was further characterized as having 6.0 percent of first acidaffins, 37 percent of second acidaffins and 3.0 percent of nitrogen bases. The aromatic oil was further characterized as having 22.0 percent of first acidaffins, 48.0 percent of second acidaffins and 19.4 percent of nitrogen bases.

For each oil, the styrene content of the rubber was varied from approximately 10.0 to 23.5 weight percent. Battery containers were molded from these compositions and tested for hardness and impact resistance with the results listed in Table III below.

TABLE III

| Oil | | Saturated | Aromatic | Saturated | Aromatic |
|---|---|---|---|---|---|
| Styrene Content of SBR | | 10% | 10% | 23.5% | 23.5% |
| Hardness | Out. | 68 | 69 | 71 | 71 |
| | In. | 66 | 67 | 67–8 | 70 |
| | Bot. | 66 | 68 | 69 | 71 |
| Impact at 77°F | | | | | |
| | Range | 13–21 | 12–18 | 21–29+ | 15–29 |
| | Ave. | 16.8 | 15.8 | 25.5+ | 22.2 |

TABLE III—Continued

| Oil | | Saturated | Aromatic | Saturated | Aromatic |
|---|---|---|---|---|---|
| Styrene Content of SBR | | 10% | 10% | 23.5% | 23.5% |
| Impact at 0°F | | | | | |
| | Range | 13–17 | 10–15 | 14–21 | 4–8 |
| | Ave. | 14.8 | 12.5 | 16.3 | 6.3 |
| Impact at –20°F | | | | | |
| | Range | 10–13 | 8–10 | 6–8 | 2–2 |
| | Ave. | 12.0 | 9.0 | 6.8 | 2.0 |
| Impact at –30°F | | | | | |
| | Range | 7–10 | 5–6 | 4–5 | 1–2 |
| | Ave. | 8.5 | 5.5 | 4.2 | 1.5 |
| Impact at –40°F | | | | | |
| | Range | 7–8 | 3–4 | 3–4 | 1–2 |
| | Ave. | 7.2 | 3.2 | 3.2 | 1.5 |

The above results demonstrate the significantly improved impact performance at sub-zero temperatures of compositions prepared from the saturated oil. Particularly at –40°F, the containers from the saturated oil provided ratings in the order of twice those of the containers from the aromatic oils.

EXAMPLE IV

The following tests were conducted to compare the low temperature, impact properties of rubber compositions containing semi-anthracite coal dust with comparable compositions containing bituminous coal dust as the filler component of such compositions with varying levels of styrene for the purpose of showing the differences between the compositions disclosed in our prior U.S. Pat. No. 3,359,229 containing bituminous coal dust and those of this present application containing semi-anthracite coal dust:

Two series of rubber compositions were prepared in accordance with the procedures of Example I where the coal dust filler employed in one series bituminous and the other series the coal dust employed was semi-anthracite. In both series the amount of styrene in the compositions was varied by blending a styrene-butadiene copolymer rubber with a polybutadiene rubber. The bituminous coal dust employed in the compositions corresponds to the analysis set forth in our prior U.S. Pat. No. 3,359,229 and the semi-anthracite coal dust had the following analysis:

Dry Fixed Carbon = Greater than 85 and Less than 92 percent
Dry Volatile Matter = Greater than 8 and Less than 14 percent
Nonagglomerating — Physical Property The rubber compositions prepared and employed in the test are described in the following Table IV.

TABLE IV

TABLE OF COMPOSITIONS

| Sample No. | 1 | 2 | 3 | 4 | 5 | 6 | 7 | 8 | 9 | 10 |
|---|---|---|---|---|---|---|---|---|---|---|
| Type of Coal Dust | SEMI- ANTHRACITE | | | | | BITUMINOUS | | | | |
| Butadiene-Styrene Rubber Component, Lbs. | 331 | 331 | 331 | 331 | 331 | 331 | 331 | 331 | 331 | 331 |
| % Styrene in Rubber Component | 20 | 15 | 10 | 5 | 0 | 20 | 15 | 10 | 5 | 0 |
| Coal Dust, Lbs. | 2494 | 2494 | 2484 | 2478 | 2478 | 2304 | 2304 | 2304 | 2304 | 2304 |
| Sulphur | 36.5 | 36.5 | 36.5 | 36.5 | 36.5 | 60 | 60 | 60 | 60 | 60 |
| Process Oil (1) (Shellflex 1371) | 174 | 174 | 184 | 190 | 190 | 206 | 206 | 206 | 206 | 206 |
| Accelerator (Aliphatic aldehyde Aromatic Amine Condensation Product) | 7 | 7 | 7 | 7 | 7 | 7 | 7 | 7 | 7 | 7 |
| Lime | 265 | 265 | 265 | 265 | 265 | 394 | 394 | 394 | 394 | 394 |
| Mold Release Agent (Aliphatic Amine) | 8 | 8 | 8 | 8 | 8 | 8 | 8 | 8 | 8 | 8 |

(1) ANALYSIS OF OIL:
SSU Viscosity at 100°F = 500–2000
Flash Point °F = 420

Clay-Gel Analysis:
% Polar (or Nitrogen Bases) = Max. 4.0
% Aromatics - I (1st Acidaffins) = Max. 17.0
% Aromatics - II (2nd Acidaffins) = 30–40
% Saturates = 45–65

The rubber compositions prepared were molded into battery containers for impact testing at low temperatures in accordance with the procedures previously described and the test results obtained are summarized in Table V with the results for the tests at −20° and −30°F being presented in attached Graphs I and II respectively.

TABLE V

Impact Properties - Molded Rubber Compositions Containing Bituminous (Bit) and Semi-Anthracite (S.A.) at Sub-zero Temperatures with Reduced Styrene Content

| Sample No. | | 1 / 6 | 2 / 7 | 3 / 8 | 4 / 9 | 5 / 10 |
|---|---|---|---|---|---|---|
| Weight % Styrene in Rubber Component | | 20 | 15 | 10 | 5 | 0 |
| Temp. of Impact °F | Type of Coal Dust | | | Impact (Inch-Pounds) | | |
| +77 | S.A. | 28.0 | 27.4 | 30.4 | 27.0 | 24.4 |
|  | Bit | 25.6 | 25.6 | 24.6 | 25.6 | 20.6 |
| −20 | S.A. | 11.6 | 19.0 | 23.6 | 29.6 | 26.0 |
|  | Bit | 16.0 | 15.0 | 19.6 | 20.0 | 14.6 |
| −30 | S.A. | 4.6 | 7.6 | 9.6 | 14.0 | 14.0 |
|  | Bit | 8.0 | 6.0 | 8.0 | 9.0 | 6.6 |

As may be observed from the data of Table V and from Graphs I and II the impact value of the compositions containing semi-anthracite coal dust are higher at low temperatures than the impact values of the corresponding compositions containing bituminous coal dust as the filler.

It may also be observed particularly from Graphs I and II that as the percent styrene is reduced and especially below about 10 percent the impact value for the bituminous compositions tends to decrease while the impact value of the semi-anthracite actually increases.

It is accordingly apparent that the rubber compositions as disclosed in our prior U.S. Pat. No. 3,359,518 which contain bituminous coal dust, even with a reduction in styrene below 10 percent, do not have the impact properties of our present rubber compositions of the present applications which contain semi-anthracite as the filler.

While the invention has been described in conjunction with specific examples thereof, these are illustrative only. Accordingly, many alternatives, modifications, and variations will be apparent to those skilled in the art in the light of the foregoing description and it is therefore intended to embrace all such alternatives, modifications, and variations as to fall within the spirit and broad scope of the appended claims.

We claim:

1. A molded article having improved impact peformance at sub-zero temperatures, the article being formed by curing in a mold a rubber composition characterized by an elastomeric butadiene polymer having a reduced styrene content of less than about 10 weight percent, the composition containing about 8–20 weight percent of the polymer, and based on the weight of the polymer about 8–25 weight percent sulfur and about 40–70 weight percent of a saturated oil, and the remainder primarily an inert filler of semi-anthracite coal wherein said oil is characterized by maximums of about 8 percent nitrogen base components and 17 percent first acidaffins and a minimum of about 75 percent of saturates, second acidaffins, or mixtures thereof said composition containing an activator comprising lime.

2. The article of claim 1 wherein the polymer is a butadiene styrene copolymer with a styrene content of from about 5 to about 10 weight percent.

3. The article of claim 2 wherein the sulfur is present within the range of from about 8 to about 16 weight percent based upon the polymer.

4. A multicell battery container having a hardness at least comparable to semi-hard rubber compositions and further characterized by improved impact performance at sub-zero temperatures, the container being molded from the composition of claim 1.

5. The container of claim 4 wherein the polymer of the rubber composition is composed primarily of polymeric butadiene units and has a styrene content in the amount of from about 5 to 10 weight percent.

6. The container of claim 5 wherein the rubber composition contains sulfur within the range of from about 8 to about 16 weight percent based upon the polymer.

7. The container of claim 4 wherein the rubber composition has a sulfur content of about 8 to about 16 weight percent and the polymer contains from about 5 to about 10 weight percent styrene.

* * * * *